Jan. 28, 1958 J. L. PURVIS 2,821,215
ELEVATED WORK SUPPORT ATTACHMENT FOR BANDSAW MACHINE
Filed Oct. 19, 1956 2 Sheets-Sheet 2
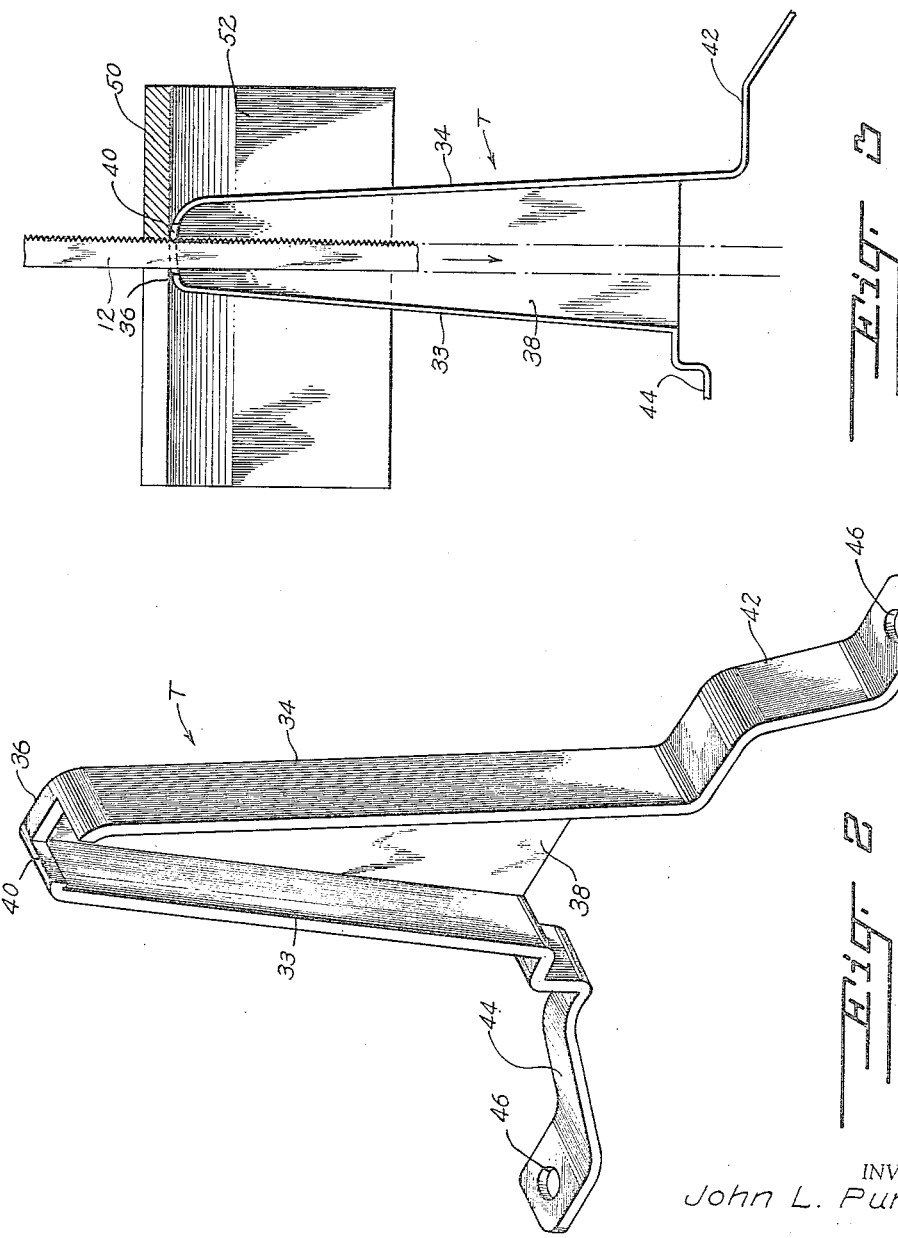
INVENTOR
John L. Purvis
BY Donald P. Smith
ATTORNEY

United States Patent Office 2,821,215
Patented Jan. 28, 1958

2,821,215

ELEVATED WORK SUPPORT ATTACHMENT FOR BANDSAW MACHINE

John L. Purvis, Highland, Md., assignor to ACF Industries, Incorporated, New York, N. Y., a corporation of New Jersey Application October 19, 1956, Serial No. 617,128

5 Claims. (Cl. 143—132)

This invention relates generally to machine tools and more particularly to band saws.

In band saws of conventional and known construction the usual flat work table carried thereon is not necessarily conducive to ease of manipulation when a work piece has a depending edge, for example a flange, and it is desired to form apertures or grooves in the planar surfaces of the piece. As will later be more fully pointed out this invention provides a novel attachment for use with a band saw which lifts the work piece above the level of the conventional band saw table and by its configuration permits ease of manipulation on any irregularly shaped stock.

It is accordingly a broad object of the invention to provide a band saw table.

It is a further and more specific object of the invention to provide a band saw table which offers a limited surface for engagement by the work piece and allows ease of management.

It is a still further object of the invention to provide a band saw table in substantially the form of a truncated inverted V wherein the work piece is supported on the foreshortened apex.

It is a yet further object of the invention to improve on the machine tool tables now in use.

Summarily stated, the invention comprises an elevated table for use with an existing band saw table consisting of a pair of longitudinal members fixed in outward and downward flaring relationship from the saw blade as an axis of symmetry and having an arcuate plate joining between the upper ends of said members wherein the center of revolution of the arc lies on the saw blade axis. A kerf is formed in the arcuate plate to receive the saw blade, and a web extends between the longitudinal members to act as a stiffening member and as a guard for the operator. Feet are formed on the respective members for securing the organization to a band saw frame.

Further objects and advantages of the invention will be in part explained and in part obvious from the following description taken in conjunction with the drawings in which:

Figure 2 is a perspective view of the band saw table, per se.

Figure 3 is a longitudinal elevation showing the band saw table in use with a work piece.

Figure 1:
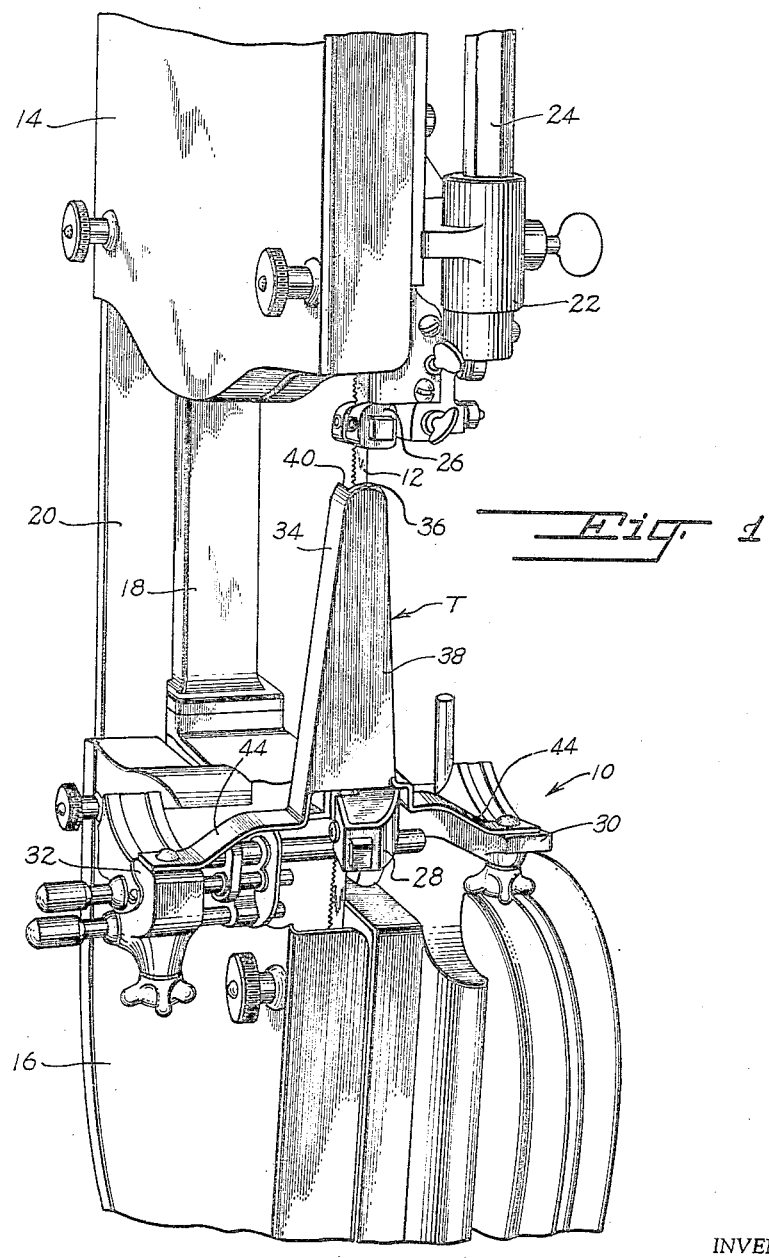
Figure 1 is a perspective view of a band saw machine showing the table mounted in place.

Referring now to the drawings wherein like or similar parts are designated by like reference characters, 10 indicates generally a band saw structure having a blade 12 which is conveyed within drum casing 14 and 16 to thereby rotate continuously in the well known manner. A channel 18 for passing the blade from the upper to the lower drum is fixed to arm 20 substantially as shown. An upper blade guide 22 slidably secured to rod 24 acts to position the band saw blade against lateral motion by providing a bearing 26 guiding the saw in its travel. A similar guide 28 is disposed below the upper guide and is in this illustration partly concealed by the installation of the elevated table T. The conventional table has been removed from this saw and the table supports 30 and 32 are depended upon to hold applicant's structure firmly in place.

Figure 2 illustrates in detail the construction of the table. A pair of elongated leg members 33 and 34 are arranged to flare outwardly and downwardly from the band saw as an axis and have an arcuate plate 36 joining between them at the upper end. It will be understood that this plate may be of planar configuration but it has been found in practice that a curving surface tends to give a point or line contact with a work piece thereby allowing free movement in two dimensions without danger of unnecessary friction between the table top and the work. A web 38 is secured to the elongated members on one side thereof and a channel 40 is formed in the arcuate portion 36 to receive the saw blade. Feet 42 and 44 having apertures 46 are fastened to each respective member to secure the table firmly to the machine frame. The several off-set step portions of the feet (unreferenced) are necessary to avoid the guide members of the particular type of band saw. It will however be understood that these form no part of the invention but are expedients only to fit the table onto a machine known in the art. As shown in Figure 2 the organization may be made from a single longitudinal strap of metal having high tensile strength. It may be readily bent into the configuration there shown and the web 38 may be soldered or welded thereto. The general configuration of the table is that of a truncated triangle, the shortened apex adapted to receive and support a work piece.

Figure 3 illustrates the table in use. The band saw blade 12 passes readily through the channel 40 formed in arcuate member 36 and work piece 50 having a depending skirt 52 is supported on the arcuate portion 36 and substantially on a point thereof to allow ease of rotation and translation thereof. In this figure the direction of motion of the saw blade is indicated and the work piece is shown as having a portion thereof cut from a surface deemed to be at right angles to skirt 52.

The table disclosed herein may be integrally formed on a band saw or it may be used to replace the table of band saws known in the art. The use of this invention enables curved surfaces to be machined and not only does the elevated table increase the operations that can be performed by band saws but it saves time by eliminating layout operations that are necessary when curved surfaces are to be sawed on a flat table.

While the invention is here illustrated and described with respect to certain preferred embodiments thereof many changes may be made without departing from the generic spirit and scope of the invention as set forth herein and in the claims appended hereto.

I claim:

1. An elevated table for use with a band saw machine comprising a pair of elongated leg members having their respective longitudinal axes forming an acute angle pointed upwardly, a work supporting plate joining between the members and substantially normal to a line bisecting the angle of convergence, a channel fashioned in said plate to receive a continuous saw blade, the longitudinal axis of the blade lying on the line bisecting the angle of convergence, and elements formed on the respective lower ends of said members for securing the table to the machine frame.

2. A table for elevating a work piece above the frame of a machine of the type having a continuous saw blade comprising in combination a pair of elongated members flaring outwardly and downwardly from the saw blade as an axis of symmetry, an arcuate plate joining between the upper ends of said members the center of revolution of the arc lying on the saw blade axis, a channel formed in the said plate to receive the saw blade, a web extending between the respective members on the side thereof opposed to the said channel, and elements formed on the lower parts of the respective members for conforming to the machine frame.

3. A table for elevating a work piece above the frame of a machine of the type having a continuous saw blade comprising in combination a pair of elongated members converging upwardly and forming an acute angle bisected by the blade, an arcuate plate joined between the upper ends of said members the center of revolution of the arc lying on the longitudinal axis of the blade, a channel formed in the said plate to receive the blade, a web extending between the said members to provide lateral stability, and feet formed on the bottom of the members to be fixed to the machine frame.

4. An elevated table for use with a band saw comprising a member having legs converging upwardly at an acute angle, a plate joining between the upper ends of said legs and defining a flat topped inverted V, a channel formed in one edge of said plate to receive an endless saw blade, a web extending between the said legs and normal to said plate, and a foot fashioned on each respective leg to join with the band saw frame.

5. An elevated table for use with a band saw machine comprising a pair of legs converging upwardly at an acute angle, a work supporting plate joining the upper ends of the legs to define a truncated inverted V, a channel formed in one edge of said plate, an endless saw blade movable within said channels, a web secured to each respective leg to extend between the same to provide lateral stiffening, and a foot fashioned on each leg to rest against the machine frame.

References Cited in the file of this patent

UNITED STATES PATENTS

| | | |
|---|---|---|
| 2,472,570 | Christie | June 7, 1949 |
| 2,783,793 | Prince et al. | Mar. 5, 1957 |

FOREIGN PATENTS

| | | |
|---|---|---|
| 41,186 | Germany | Nov. 8, 1887 |